US007972551B2

(12) United States Patent
Ochi et al.

(10) Patent No.: US 7,972,551 B2
(45) Date of Patent: Jul. 5, 2011

(54) METHOD OF PRODUCING SOLID BODY HAVING DEPRESSED PORTIONS ON ITS SURFACE AND METHOD OF PRODUCING ELECTROPHOTOGRAPHIC PHOTOSENSITIVE MEMBER

(75) Inventors: Atsushi Ochi, Numazu (JP); Harunobu Ogaki, Suntou-gun (JP); Hiroki Uematsu, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 152 days.

(21) Appl. No.: 12/553,286

(22) Filed: Sep. 3, 2009

(65) Prior Publication Data

US 2010/0075246 A1 Mar. 25, 2010

(30) Foreign Application Priority Data

Sep. 19, 2008 (JP) ................................ 2008-241017

(51) Int. Cl.
*C08J 5/18* (2006.01)
(52) U.S. Cl. ................................................ 264/331.11
(58) Field of Classification Search ............. 264/331.11; 203/29, 38; 430/127
See application file for complete search history.

(56) References Cited

U.S. PATENT DOCUMENTS

| | | | |
|---|---|---|---|
| 7,413,840 | B1 | 8/2008 | Ogaki et al. |
| 2008/0182024 | A1 | 7/2008 | Ochi et al. |

FOREIGN PATENT DOCUMENTS

| | | | |
|---|---|---|---|
| EP | 1783162 | A1 | 5/2007 |
| JP | 2001-157574 | A | 6/2001 |
| JP | 2002-335949 | A | 11/2002 |
| JP | 4018741 | B1 | 12/2007 |
| JP | 2008-179749 | A | 8/2008 |
| JP | 2008-203807 | A | 9/2008 |
| WO | 2006/126735 | A1 | 11/2006 |

OTHER PUBLICATIONS

Baohui Zhao et al., "Fabrication of Honeycomb Ordered Polycarbonate Films Using Water Droplets as Template," 515 Thin Solid Films 3629-3634 (2007).

*Primary Examiner* — Yogendra N Gupta
*Assistant Examiner* — Robert J Grun
(74) *Attorney, Agent, or Firm* — Fitzpatrick, Cella, Harper & Scinto

(57) ABSTRACT

A method for producing a solid body having depressed portions on its surface is provided. The method includes: using a solution which includes a solvent A, a solvent B, a solvent C, and a polymer compound, where the solvent B is a hydrophobic solvent, the solvent A is a hydrophilic solvent having a boiling point not lower than the boiling point of the solvent B, and the solvent C is a non-hydrophobic solvent having a boiling point lower than the boiling point of the solvent B, and the contents of the solvent A, solvent B, and solvent C satisfy specific conditions; and solidifying the solution while forming depressed portions on the surface of the solution by condensation during the process of evaporating the solvents included in the solution.

8 Claims, 1 Drawing Sheet

METHOD OF PRODUCING SOLID BODY HAVING DEPRESSED PORTIONS ON ITS SURFACE AND METHOD OF PRODUCING ELECTROPHOTOGRAPHIC PHOTOSENSITIVE MEMBER

BACKGROUND OF THE INVENTION

1. Field of the Invention

The present invention relates to a method of producing a solid body having depressed portions on its surface, and to a method of producing an electrophotographic photosensitive member.

2. Description of the Related Art

Recently, in a variety of industrial fields, attention has been paid to the shape of solid body surfaces, and research is being conducted. Japanese Patent Application Laid-Open Nos. 2001-157574 and 2002-335949 disclose a method of producing a porous body having a honeycomb structure by casting a hydrophobic organic solvent solution of a biodegradable, amphiphilic polymer to bedew the cast solution surface. This porous body is expected to be used in a medical field. Further, Japanese Patent No. 4018741 discloses a method of producing a solid body having a varied surface shape by combining a hydrophilic solvent and a hydrophobic solvent under specific conditions. This solid body is expected to be used in a wide range of fields. In addition, Japanese Patent Application Laid-Open Nos. 2008-179749 and 2008-203807 disclose a method of producing a solid body having depressed portions on a surface.

However, with the methods disclosed in Japanese Patent Application Laid-Open Nos. 2001-157574 and 2002-335949, in order to bedew the cast solution surface, a special amphiphilic polymer is required and the surrounding environment should be controlled. Especially in the case of blowing a high-humidity gas or air, there is a possibility that the surface of a cast film may be disrupted, and there is a problem in that the production conditions and apparatus are greatly restricted.

Further, in the method disclosed in Japanese Patent No. 4018741, there is room for further improvement in terms of productivity, selectivity of polymer compound, and the controllability of depressed portions.

SUMMARY OF THE INVENTION

An object of the present invention is to provide a method of producing a solid body having depressed portions on its surface.

The present invention is a method for producing a solid body having depressed portions on its surface, including: using a solution which includes a solvent A, a solvent B, a solvent C, and a polymer compound, where the solvent B is a hydrophobic solvent, the solvent A is a hydrophilic solvent having a boiling point not lower than the boiling point of the solvent B, and the solvent C is a non-hydrophobic solvent having a boiling point lower than the boiling point of the solvent B, and the contents of the solvent A, solvent B, and solvent C satisfy the following conditions (1) to (5); and solidifying the solution while forming depressed portions on the surface of the solution by condensation during the process of evaporating the solvents contained in the solution:

(1) the content of the solvent A is 0.1 mass % or more and less than 25.0 mass % based on the total mass of all the solvents contained in the solution, (2) the content of the solvent B is larger than the content of the solvent A, (3) the content of the solvent B is 5.0 mass % or more and 49.9 mass % or less based on the total mass of all the solvents contained in the solution, (4) the content of the solvent C is 50.0 mass % or more and 94.9 mass % or less based on the total mass of all the solvents contained in the solution, and (5) the total content of the solvent A, solvent B, and solvent C is 90.0 mass % or more based on the total mass of all the solvents contained in the solution.

According to the present invention, a method is provided in which a solid body having depressed portions on a surface can be stably produced at a very low cost. Especially when the above-described specific solution composition is selected, even in a normal temperature and humidity environment, it is possible to provide a production method of a solid body in which depressed portions on a surface can be self-assembled, or more specifically, depressed portions can be formed without any other control, just by evaporating the solvent. The "solid body" having depressed portions on its surface which is produced by the production method of the present invention holds promise of application to a variety of industrial fields, in consideration of various uses such as a separation membrane, an adsorbent, a catalyst, a carrier, a battery member, a medical material, an optical material, a lightweight structural material, a cushioning material, an insulation material, an acoustic material, vibration-damping material, an electrically conductive material, a piezoelectric material, a friction material, a slidable material and a low-dielectric material.

Further features of the present invention will become apparent from the following description of exemplary embodiments with reference to the attached drawings.

DESCRIPTION OF THE EMBODIMENTS

Figure 1A:
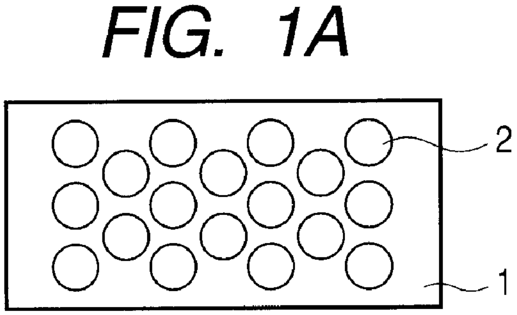
FIGS. 1A, 1B, 1C, 1D and 1E are views illustrating examples of shapes as seen in the observation of depressed portions formed on the surface of a solid body by the production method of the present invention.

The present invention will be described below in more detail.

In the present invention, the term "hydrophilic solvent" refers to a solvent which exhibits a large affinity with water, and the term "hydrophobic solvent" refers to a solvent which exhibits a small affinity with water. In the present invention, a determination on whether a solvent is a hydrophilic solvent or a hydrophobic solvent is made according to the following experiment and criteria.

(Experiment)

First, in a normal temperature and humidity condition (23±3° C., 50±10% RH), 50 ml of water is measured and placed in a 50 ml graduated cylinder. Next, 50 ml of an objective solvent to be determined is measured and placed in a 100 ml graduated cylinder, and thereto, the 50 ml of water previously measured is added. The resultant is thoroughly stirred with a glass rod until the whole solution is uniform. A lid is put on the cylinder so that the solvent and the water are not volatize. The solution is sufficiently left standing until air bubbles disappear and the interface becomes stable. The state of the mixed solution in the 100 ml graduated cylinder is observed, and the volume of the aqueous phase is measured.

(Criteria)

If the volume of the aqueous phase (a phase composed only of water) is 0 ml or more to 5 ml or less, the objective solvent is determined to be hydrophilic. If the volume of the aqueous phase (a phase composed only of water) is 45 ml or more to 50 ml or less, the objective solvent is determined to be hydrophobic. In the case of a uniform single phase, since the volume of the aqueous phase (a phase composed only of water) is 0 ml, the objective solvent is determined to be hydrophilic. In the cases outside these ranges, the solvent is neither hydrophilic nor hydrophobic.

Specific Examples

In the above-described experiment, if the objective solvent is toluene, for example, the volume of the aqueous phase is 50 ml, and thus is determined to be hydrophobic. If the objective solvent is dimethyl sulfoxide (DMSO), a single phase is formed, and thus the volume of the aqueous phase (a phase composed only of water) is 0 ml. In this case, the solvent is determined to be hydrophilic. Further, if the solvent is 1,1-dimethoxymethane(methylal), the volume of the aqueous phase (a phase composed only of water) is 69 ml, and thus the solvent is neither hydrophilic nor hydrophobic.

The polymer compound in the present invention can be variously selected without any particular restriction depending on the functional properties required for the solid body to be obtained as a product, as long as such a polymer compound is dissolved in the solvent system of the present invention (the solvents contained in the solution). Taking into account application to an electronic device, examples of solvents which can be preferably used include acrylic resin, methacrylic resin, styrene resin, styrene-acrylonitrile copolymer resin, polyester resin, polycarbonate resin, polyarylate resin, polysulfone resin, polyphenyleneoxide resin, epoxy resin, polyurethane resin, alkyd resin, unsaturated resins, electrically conductive resins, aromatic polyester resins, and diallylphthalate resin. These polymer compounds may be used each singly or in combination.

The solvents in the solution of the present invention mainly include the hydrophobic solvent B, the hydrophilic solvent A, and the non-hydrophobic solvent C. Table 1 indicates the relationship between the types and boiling points of these solvents in the present invention, and the relationship between the types and contents of the solvents.

TABLE 1

| Boiling Point | Hydrophobic Solvent | Hydrophilic Solvent | Other Solvent |
|---|---|---|---|
| High ↑ | | Solvent A | |
| | Solvent B | Solvent A | |
| Low ↓ | | Solvent C | Solvent C |

0.1 mass % ≦ A < 25.0 mass %
B Content > A Content
5.0 mass % ≦ B ≦ 49.9 mass %
50.0 mass % ≦ B ≦ 94.9 mass %
Total Content of A + B + C ≧ 90 mass %

The determination on whether a solvent is the solvent B is made based only on whether the solvent is a hydrophobic solvent or not. This determination is regardless of whether the boiling point of solvent B is higher or lower than the boiling points of solvent A or solvent C. Specifically, if the solvent is hydrophobic, it is a solvent B. On the other hand, in relation to the solvent A and solvent C, the determination is made after determining the solvent B, by determining whether the solvent is a hydrophobic solvent, a hydrophilic solvent, or none of them, and then also considering whether the boiling point is higher or lower than the boiling point of solvent B, to thereby determine whether the solvent is the solvent A, the solvent C, or none of them.

The production method according to the present invention is characterized in that condensation is promoted by using the hydrophilic solvent A and controlling the solvent system of the polymer compound solution. Therefore, in order to form depressed portions by bedewing with water a surface coated with the solution of the present invention, the solvent A content should be 0.1 mass % or more based on the total mass of all the solvents contained in the solution. In view of the relationship between the content of the solvent B and the content of the solvent C described later, the maximum content of solvent A is less than 25.0 mass % based on the total mass of all the solvents contained in the solution.

Further, for the purpose of stabilizing the depressed portions formed by condensation of water, the hydrophobic solvent B is required, and the solvent B content should be 5.0 mass % or more based on the total mass of all the solvents contained in the solution. In addition, the solvent B content exceeds the solvent A content. The solvent B boiling point is preferably 100° C. or more. Further, the solvent A boiling point is not lower than the solvent B boiling point. In view of the relationship between the content of the solvent A described above and the content of the solvent C described later, the maximum content of the solvent B is 49.9 mass % or less based on the total mass of all the solvents contained in the solution.

Further, in the present invention, the solvent C is used as a non-hydrophobic solvent (a solvent which is not a hydrophobic solvent). The solvent C is selected from hydrophilic solvents or solvents which are neither a hydrophilic solvent nor a hydrophobic solvent. The boiling point of the solvent C is lower than the boiling point of the solvent B. The solvent C boiling point is preferably 70° C. or lower, and more preferably 45° C. or lower. Since the boiling point of the solvent C is lower than the boiling points of the solvent A and solvent B, after the solution of the present invention is applied, the solvent C tends to evaporate earlier than the other solvents. Therefore, after water is condensed on the surface of the solution, in the process of forming and stabilizing the depressed portions, the solvent A and solvent B would play a dominant role.

In the present invention, the solvent C should be used in an amount of 50.0 mass % or more based on the total mass of all the solvents contained in the solution. This means that solvent C has the highest composition ratio among the solvents in the solution of the present invention. As a result, first, since the solidification of the solution of the polymer compound is promoted, production efficiency can be improved. Second, the controllability of the depressed portions to be formed by condensation can be improved. Third, the selectivity of the polymer compound can be expanded. In view of the relationship between the content of the solvent A and the content of solvent B described above, the maximum content of the solvent C is 94.9 mass % or less based on the total mass of all the solvents contained in the solution.

In the production method according to the present invention, depressed portions are formed by condensation on the surface of a polymer contained in a solution during the process of evaporating the solvents in the solution which contains the solvent A, solvent B, solvent C, and polymer compound. The "condensation" as used in the present invention means that water vapor in the air is condensed on the surface and/or inside the solution. Therefore, the "solid body having depressed portions on its surface" in the present invention also includes solid bodies having depressed portions only on their surfaces, solid bodies through which pores pass, and solid bodies in which many pores are present also inside the bodies.

In the production method according to the present invention, the depressed portions formed on the surface of the solid body by condensation and the depths of the depressed portions can be controlled by the types and amounts of the respective solvents used in the solution, or by the combination thereof. Further, the production method according to the present invention has such advantages that costs can be reduced by utilizing general-purpose solvents; production stability is excellent because the production method is simplified; and versatility is excellent and applicability is broad because no special production equipment is necessary.

Further, in the present invention, in the case of using two or more types of the solvent B in combination, the boiling point of the solvent B with the highest boiling point among such solvents becomes the solvent B boiling point used for comparison with the boiling point of the solvent A. Specifically, a hydrophilic solvent having a boiling point not lower than the boiling point of the solvent B with the highest boiling point becomes the solvent A. In addition, in the case of using two or more types of solvent B in combination, the boiling point of the solvent B with the lowest boiling point among such solvents becomes the solvent B boiling point used for comparison with the boiling point of solvent C. Specifically, a non-hydrophobic solvent having a boiling point lower than the boiling point of the solvent B with the lowest boiling point becomes the solvent C.

In the production method according to the present invention, the above-described solution can be treated in a variety of different ways according to the functional properties required for the solid body to be obtained as a product. For example, for the solid body, if forming a surface layer having depressed portions, the above-described solution can be applied onto the substrate by a known method such as dip coating or spin coating, to form the surface layer having depressed portions. Further, a thin membrane or film can be produced by peeling a film formed on the substrate by the same method from the substrate. In addition, a thin membrane or film can be produced by allowing the above-described solution to flow onto a water surface.

Further, in the production method of the present invention, various compounds may also be added to the solution for the purpose of imparting functionality to the solid body to be obtained as a product, such as a plasticizer, a release agent, a crosslinking agent, metal fine particles, organic fine particles, a surfactant, an electrically conductive compound, and an antimicrobial agent. Moreover, the types or amounts of solvent A, solvent B, and solvent C may be varied, or two or more types of solvents can be used in combination in order to control the solution viscosity, dew point, or overall coated surface smoothness, modify the solvent power of the solvent system of the solution, or control the size and depth of the pores in the product. In addition, various solvents other than solvent A, solvent B, and solvent C may be used in the production method according to the present invention. However, with the aim of stably obtaining the solid body having depressed portions on the surface, the total content of solvent A, solvent B, and solvent C should be 90.0 mass % or more based on the total mass of all the solvents contained in the solution. It is also possible to combine the step of modifying the temperature of the solution, the temperature of the substrate which is to be coated with the solution, and the humidity of the surrounding environment, with the step of blowing a high-humidity gas onto the surface of the solution.

Representative examples of the hydrophilic solvent are indicated in the following Tables 2 to 5, and representative examples of the hydrophobic solvent are indicated in Table 6. However, the hydrophilic solvent and hydrophobic solvent used in the present invention are not limited to those representative examples. Further, as a rule, the "boiling point" in Tables 2 to 6 indicates the boiling point at atmospheric pressure (1 atmosphere: 1013.25 hPa). In the case of indicating the boiling point at pressure other than atmospheric pressure, the pressure is clearly specified.

TABLE 2

Representative Examples of Hydrophilic Solvents

| No. | Name | Chemical Formula | Boiling Point |
|---|---|---|---|
| 1-1 | 1,2-Ethanediol | $HOCH_2CH_2OH$ | 198 |
| 1-2 | 1,2-Propanediol | $CH_3CHOHCH_2OH$ | 187 |
| 1-3 | 1,3-Butanediol | $HOCH_2CH_2CHOHCH_3$ | 207 |
| 1-4 | 1,4-Butanediol | $HO(CH_2)_4OH$ | 229 |
| 1-5 | Glycerin | 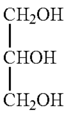 | 290 |
| 1-6 | 1,2,6-Hexanetriol | 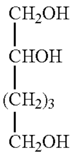 | 178 (5 mmHg) |
| 1-7 | Tetrahydrofuran | 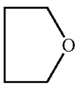 | 66 |
| 1-8 | Diethylene glycol dimethyl ether | 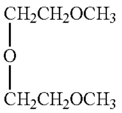 | 160 |
| 1-9 | Diethylene glycol diethyl ether | $H_5C_2OC_2H_4—O—C_2H_4OC_2H_5$ | 188 |
| 1-10 | Acetonylacetone | 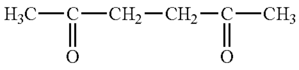 | 191 |
| 1-11 | Propionic acid | $CH_3CH_2COOH$ | 141 |
| 1-12 | Butyric acid | $CH_3CH_2CH_2COOH$ | 163 |
| 1-13 | Diethylene glycol monoacetate | $H_3CCOOC_2H_4$ $OC_2H_4OH$ | 139 (20 mmHg) |
| 1-14 | Cyclohexylamine | 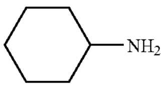 | 134 |
| 1-15 | β-Picoline | 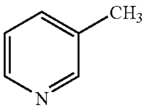 | 144 |

TABLE 3

Representative Examples of Hydrophilic Solvents (continued)

| No. | Name | Chemical Formula | Boiling Point (° C.) |
|---|---|---|---|
| 1-16 | γ-Picoline | 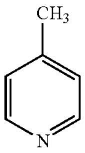 | 145 |
| 1-17 | 2,4-Lutidine | 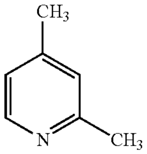 | 157 |
| 1-18 | 2,6-Lutidine | 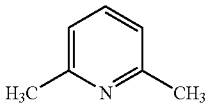 | 144 |
| 1-19 | Quinoline | 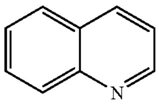 | 237 |
| 1-20 | Diethylenetriamine | $H_2NCH_2CH_2NH$ $CH_2CH_2NH_2$ | 207 |
| 1-21 | Tetraethylenepentamine | $H_2N(CH_2CH_2NH)_4H$ | 333 |
| 1-22 | N,N,N',N Tetramethylurea | $(CH_3)_2NCON(CH_3)_2$ | 177 |
| 1-23 | 2-Ethoxyethanol | $C_2H_5OCH_2CH_2OH$ | 136 |

TABLE 3-continued

Representative Examples of Hydrophilic Solvents (continued)

| No. | Name | Chemical Formula | Boiling Point (° C.) |
|---|---|---|---|
| 1-24 | 2-(Methoxyethoxy) ethanol | 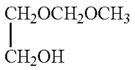 | 167 |
| 1-25 | 2-Isopropoxy ethanol | 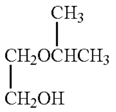 | 140 |
| 1-26 | 2-Butoxyethanol | 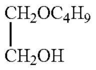 | 170 |
| 1-27 | Furfuryl alcohol | 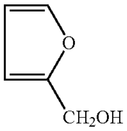 | 170 |
| 1-28 | Tetrahydrofurfuryl alcohol | 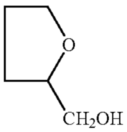 | 178 |
| 1-29 | Diethylene glycol | $HOC_2H_4OC_2H_4OH$ | 245 |
| 1-30 | Diethylene glycol monomethyl ether | $H_3CO(C_2H_4O)_2H$ | 194 |

TABLE 4

Representative Examples of Hydrophilic Solvents (continued)

| No. | Name | Chemical Formula | Boiling Point (° C.) |
|---|---|---|---|
| 1-31 | Diethylene glycol monoethyl ether | $H_5C_2O(C_2H_4O)_2H$ | 202 |
| 1-32 | Diethylene glycol monobutyl ether | $H_9C_4O(C_2H_4O)_2H$ | 230 |
| 1-33 | Triethylene glycol | $HOC_2H_4OC_2H_4O$ $C_2H_4OH$ | 288 |
| 1-34 | Triethylene glycol monomethyl ether | $H_3COC_2H_4OC_2H_4$ $OC_2H_4OH$ | 249 |
| 1-35 | Tetraethylene glycol | $HO(C_2H_4O)_4H$ | 327 |
| 1-36 | Polyethylene glycol | $HO(CH_2CH_2O)_nH$ | Varies depending on n |
| 1-37 | 1-Ethoxy-2-propanol | 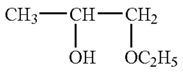 | 132 |
| 1-38 | Polypropylene glycol | $H[OCH(CH_3)CH_2]_nOH$ | Varies depending on n |
| 1-39 | 2-Aminoethanol | $H_2NCH_2CH_2OH$ | 171 |
| 1-40 | 2-(Dimethylamino) ethanol | 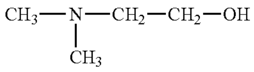 | 135 |
| 1-41 | 2-(Diethylamino) ethanol | 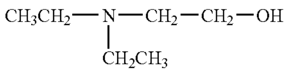 | 162 |

TABLE 4-continued

Representative Examples of Hydrophilic Solvents (continued)

| No. | Name | Chemical Formula | Boiling Point (° C.) |
|---|---|---|---|
| 1-42 | N-Butyl diethanolamine | 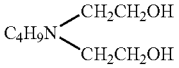 | 274 |
| 1-43 | Triethanolamine | 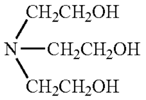 | 360 |
| 1-44 | 2,2'-Thiodiethanol | 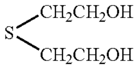 | 282 |
| 1-45 | N-Ethylmorpholine | 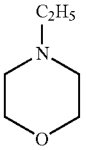 | 138 |

TABLE 5

Representative Examples of Hydrophilic Solvents (continued)

| No. | Name | Chemical Formula | Boiling Point (° C.) |
|---|---|---|---|
| 1-46 | Diethylene glycol monoethyl ether acetate | $CH_3COOCH_2CH_2OCH_2CH_2OC_2H_5$ | 217 |
| 1-47 | N,N,N',N'-Tetra methylethylenediamine | $(CH_3)_2NCH_2CH_2N(CH_3)_2$ | 121 |

TABLE 6

Representative Examples of Hydrophobic Solvents

| No. | Name | Chemical Formula | Boiling Point (° C.) |
|---|---|---|---|
| 2-1 | Toluene (methylbenzene) | 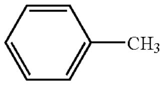 | 110 |
| 2-2 | o-Xylene (1,2-dimethylbenzene) | 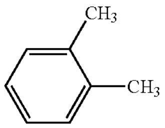 | 144 |
| 2-3 | m-Xylene (1,3-dimethylbenzene) | 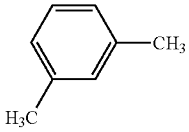 | 139 |
| 2-4 | p-Xylene (1,4-dimethylbenzene) | 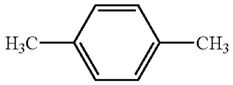 | 138 |

TABLE 6-continued

Representative Examples of Hydrophobic Solvents

| No. | Name | Chemical Formula | Boiling Point (° C.) |
|---|---|---|---|
| 2-5 | 1,3,5-Trimethylbenzene | 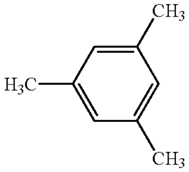 | 165 |
| 2-6 | Monochlorobenzene (chlorobenzene) | 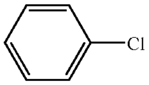 | 132 |
| 2-7 | Pentane | $C_5H_{12}$ | 36 |
| 2-8 | n-Hexane | $C_6H_{14}$ | 69 |
| 2-9 | Cyclohexane | 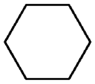 | 81 |
| 2-10 | n-Heptane | $C_7H_{16}$ | 98 |
| 2-11 | Dichloromethane | $CH_2Cl_2$ | 39 |
| 2-12 | Chloroform | $CHCl_3$ | 62 |

The production method according to the present invention is broad in the application range, so that selection of the optimal solvent differ depending on the functional properties required for the solid body to be obtained as a product. As for an example, when the present invention is applied to the surface layer of an electrophotographic photosensitive member, preferred examples of solvent A include dimethylsulfoxide, polyethylene glycol, triethylene glycol, dipropylene glycol, and tetrahydrofurfuryl alcohol. Further, preferred examples of solvent B include toluene, o-xylene(1,2-dimethylbenzene), m-xylene(1,3-dimethylbenzene), p-xylene(1,4-dimethylbenzene), 1,3,5-trimethylbenzene, and monochlorobenzene (chlorobenzene). In addition, preferred examples of solvent C include dimethoxymethane. These solvents may be used each singly or in combination.

Figure 1D:
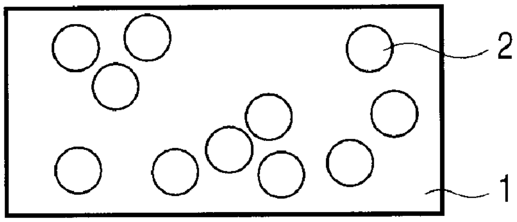
Figure 1B:
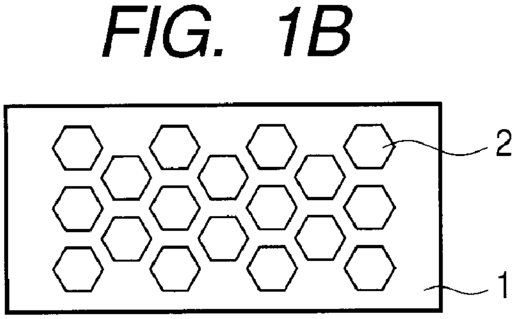
Figure 1E:
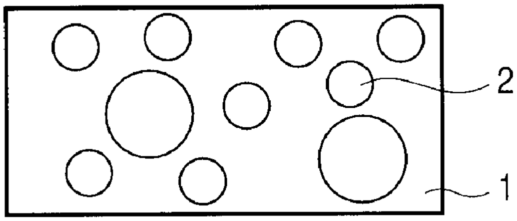
Figure 1C:
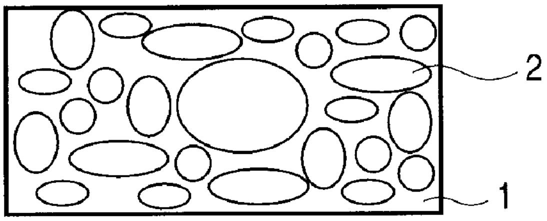

FIGS. 1A to 1E show examples of shapes as seen from surface observation of depressed portions formed on a surface of a solid body produced by the method of the present invention. In FIG. 1A to FIG. 1E, reference numeral 1 indicates the surface of the solid body, and reference numeral 2 indicates depressed portions formed on the surface of the solid body. In FIG. 1A to FIG. 1E, the surfaces 1 of the solid bodies have a plurality of independent depressed portions 2.

The present invention will now be described in more detail with reference to specific examples. However, the present invention is limited to these examples. In the examples, the term "parts" means "parts by mass", "Mw" means "weight average molecular weight", and "Mv" means "viscosity average molecular weight". Further, the polymer compounds and the charge transport material used in the examples are described in Tables 7 and 8.

TABLE 7

| Examples of Polymer Compounds | | |
|---|---|---|
| No. | Repeating Unit | Note |
| 3-1 | 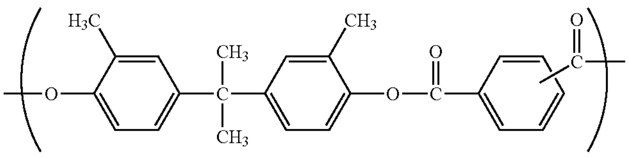 | Aromatic polyester resin Mw: 120000 Molar ratio between terephthalic acid units and isophthalic acid units of 50:50 |
| 3-2 | 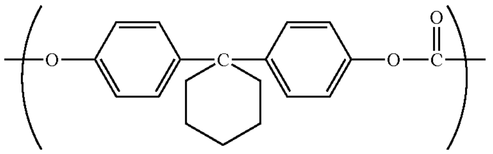 | Polycarbonate resin Mv: 20000 |
| 3-3 | 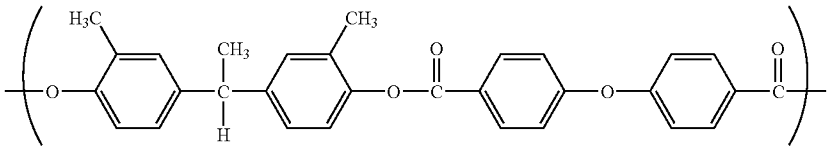 | Aromatic polyester resin Mw: 110000 |
| 3-4 | 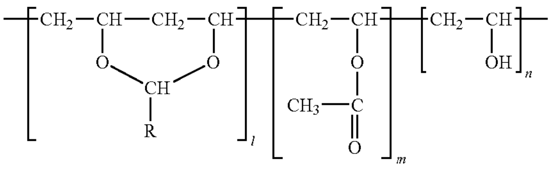 | Polyvinylbutyral resin (S-LEC BX-1) |
| 3-5 | 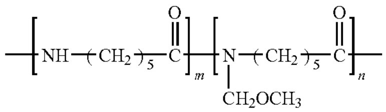 | N-Methoxy-methylated nylon resin (Toresin EF-30T) Mass % of n portion of 28 to 33% |

TABLE 7-continued

| Examples of Polymer Compounds | | |
|---|---|---|
| No. | Repeating Unit | Note |
| 3-6 | 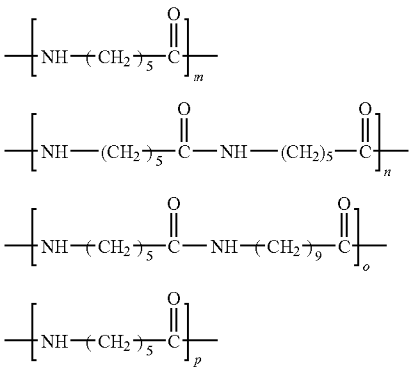 | Copolymer nylon resin (Amilan CM8000) m:n:o:p = 6:66:610:12 |
| 3-7 | 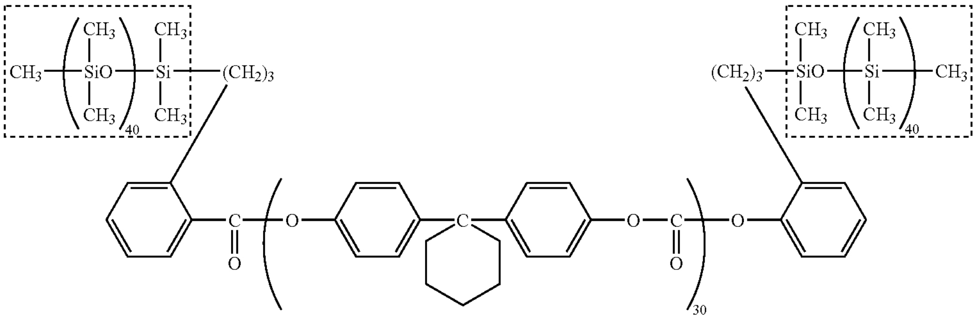 | Siloxane-modified resin Mass ratio of siloxane structures (portions encircled by dotted lines) of 40% based on total molecular weight |

TABLE 8

| Examples of Charge Transport Materials | | |
|---|---|---|
| No. | Structural Formula | Note |
| 4-1 | 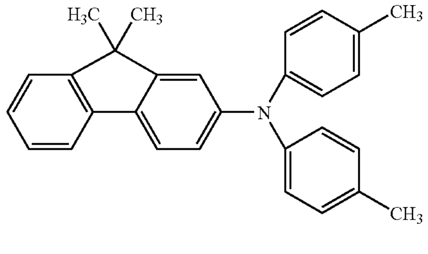 | Charge transport material (a) |
| 4-2 | 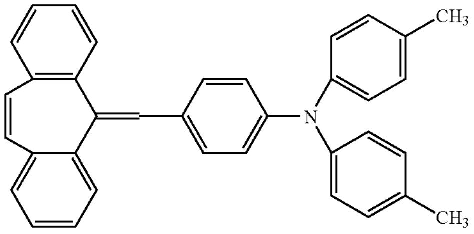 | Charge transport material (b) |

The viscosity average molecular weight (Mv) and the weight average molecular weight (Mw) of the polymer compounds described in Table 7 in the present invention were measured according to the method described below.

(Method for Measuring Viscosity Average Molecular Weight (Mv))

First, 0.5 g of an objective polymer compound to be measured was dissolved in 100 ml of methylene chloride, and the specific viscosity of the resultant mixture at 25° C. was measured using a modified Ubbelohde-type viscometer. Next, the intrinsic viscosity was determined from this specific viscosity. Then, the viscosity average molecular weight (Mv) of the objective polymer compound to b measured was calculated according to the Mark-Houwink viscosity equation. The viscosity average molecular weight (Mv) was determined as a polystyrene conversion value measured by GPC (gel permeation chromatography).

(Method for Measuring Weight Average Molecular Weight (Mw))

An objective polymer compound to b measured was placed in tetrahydrofuran, and the resultant mixture was left standing for several hours. The objective polymer compound to be measured and the tetrahydrofuran were then thoroughly mixed while shaking (mixing until agglomerates of the objective polymer compound to be measured had disappeared), and the mixture was left to stand for a further 12 hours or more. The mixture was then passed through a sample processing filter (Maishori Disk H-25-5) manufactured by Tosoh Corporation, and the resultant product was used as a sample for GPC (gel permeation chromatography).

Next, a column was stabilized in a heat chamber at 40° C. Then, the weight average molecular weight of the objective polymer compound to be measured was measured by allowing tetrahydrofuran as a solvent to flow into the column at that temperature at a flow rate of 1 ml per minute and injecting 10 μl of the sample for GPC thereinto. A column (TSKgel Super HM-M) manufactured by Tosoh Corporation was used for the column.

In the measurement of the weight average molecular weight of the polymer compound to be measured, the molecular weight distribution of the objective polymer compound to be measured was calculated from the relationship between the logarithmic value of a calibration curve prepared by using several types of monodisperse polystyrene standard samples and the count number. Ten samples were used for the monodisperse polystyrene standard samples used to prepare the calibration curve. These ten samples were manufactured by Aldrich, and had monodisperse polystyrene molecular weights of 3,500, 12,000, 40,000, 75,000, 98,000, 120,000, 240,000, 500,000, 800,000, and 1,800,000. For the detector, an RI (refractive index) detector was used.

Example 1

A solution was prepared by mixing and dissolving 3 parts of dimethyl sulfoxide as solvent A, 27 parts of monochlorobenzene as solvent B, 30 parts of dimethoxymethane as solvent C, and 12 parts of polycarbonate resin (trade name: "Iupilon Z200", manufactured by Mitsubishi Gas Chemical Company, Inc.) as the polymer compound. In the resultant solution, the mass ratios of the respective solvents (solvent ratio) were, based on the total mass of all the solvents contained in the solution, 5% for solvent A, 45% for solvent B, and 50% for solvent C. Next, this solution was applied onto a glass plate in a normal temperature and humidity condition (23° C., 50% RH). Then, the glass plate was left standing for 3 minutes under a normal temperature and humidity condition while evaporating the solvent to form depressed portions on the coated film surface. The glass plate was then dried (heated drying) at 150° C. for 1 hour to form a polycarbonate resin film on the glass plate. Upon observing this resin film with a laser microscope ("VK-9500", manufactured by Keyence Corporation), it was found that a shape was formed in which a lot of pores were formed on the surface. The pore diameter was about 10 μm, and the depth was about 8 μm.

Examples 2 to 25

Resin films were obtained in the same manner as in Example 1, except that the types and amounts (added amounts) of the solvent A, solvent B, solvent C, and polymer compound were changed as shown in Tables 9 to 11. Further, the surfaces of the resin films were observed in the same manner as in Example 1. These results are shown in Table 14. The polyethylene glycol used in the examples had a boiling point of 250° C. (Polyethylene Glycol 200, Kishida Chemical Co., Ltd.).

Example 26

An application example of the present invention to the surface layer of an electrophotographic photosensitive member (an example in which the "solid body having depressed portions on its surface" according to the present invention is formed as the surface layer of an electrophotographic photosensitive member) will be shown below.

An aluminum cylinder with a length of 260.5 mm and a diameter of 30 mm obtained by hot extrusion in a 23° C., 60% RH environment (JIS-A3003, aluminum alloy ED tube, manufactured by Showa Aluminum Corporation) was used as a support (electrically conductive cylindrical support).

A dispersion was prepared by dispersing 6.6 parts of $TiO_2$ particles coated with oxygen-deficient $SnO_2$ as electrically conductive particles (powder resistivity: 80 Ω·cm; $SnO_2$ coating ratio (mass ratio): 50%), 5.5 parts of phenol resin as a binding resin (trade name: Plyophen J-325, manufactured by DIC Corporation; resin solid content: 60%), and 5.9 parts of methoxypropanol as a solvent for 3 hours with a sand mill using 1 mm diameter glass beads. To the obtained dispersion, 0.5 parts of silicone resin particles as a surface roughening material (trade name: Tospearl 120, manufactured by GE Toshiba Silicone Co., Ltd.; average particle size: 2 μm) and 0.001 parts of silicone oil as a leveling agent (trade name: SH28PA, manufactured by Dow Corning Toray Co., Ltd.) were added, and the resultant mixture was stirred to prepare a coating solution for an electrically conductive layer. This coating solution for an electrically conductive layer was applied on the support by dip coating. The coating solution was then thermally cured by drying for 30 minutes at 140° C. to form an electrically conductive layer having an average film thickness of 15 μm at the position 130 mm apart from the upper end of the support.

Next, 4 parts of N-methoxymethylated nylon resin (trade name: Toresin EF-30T, manufactured by Teikoku Chemical Industries Co., Ltd.) and 2 parts of a copolymer nylon resin (trade name: Amilan CM8000, manufactured by Toray Industries Inc.) were dissolved in a mixed solvent of 65 parts of methanol and 30 parts of n-butanol to prepare a coating solution for an intermediate layer. This coating solution for an intermediate layer was applied on the electrically conductive layer by dip coating, and dried at 100° C. for 10 minutes to form an intermediate layer having an average film thickness of 0.5 μm at the position 130 mm apart from the upper end of the support.

Next, a dispersion was prepared by dispersing 10 parts of hydroxygallium phthalocyanine crystals (charge generation material) in crystal form having strong peaks at Bragg angles (2θ±0.20°) of 7.5°, 9.9°, 16.3°, 18.6°, 25.1°, and 28.3° in CuKa characteristic X-ray diffraction, 5 parts of polyvinylbutyral (trade name: S-LEC BX-1, manufactured by Sekisui Chemical Co., Ltd.), and 250 parts of cyclohexanone for 1 hour with a sand mill apparatus using 1 mm diameter glass beads. A coating solution for a charge generation layer was prepared by placing 250 parts of ethyl acetate into the obtained dispersion. This coating solution for a charge generation layer was applied on the intermediate layer by dip coating, and dried at 100° C. for 10 minutes to form a charge generation layer having an average film thickness of 0.16 μm at the position 130 mm apart from the upper end of the support.

Next, a coating solution for a surface layer (charge transport layer) was prepared by mixing and dissolving 2.94 parts of dimethyl sulfoxide as solvent A, 14.7 parts of monochlorobenzene as solvent B, 41.16 parts of dimethoxymethane as solvent C, 8.5 parts of polycarbonate resin (trade name: "Iupilon Z200", manufactured by Mitsubishi Gas Chemical Company, Inc.) as the polymer compound, 4.8 parts of the charge transport material (a) shown in Table 8, and 0.5 parts of the charge transport material (b) described in Table 8. In this coating solution for a surface layer, the mass ratios of the solvents A, B, and C were 5% for solvent A, 25% for solvent B, and 70% for solvent C, based on the total mass of all the solvents contained in the solution. This coating solution for a surface layer was then applied on the charge generation layer by dip coating in a normal temperature and humidity environment (23° C., 50% RH). After that, the substrate with the coated film thereon was left standing for 3 minutes in a normal temperature and humidity environment to thereby form depressed portions on the coated film surface. Further, the resultant was placed in a blow dryer whose interior was previously heated to 120° C. and dried (drying by heating) for 1 hour, thereby forming a charge transport layer having an average film thickness of 20 μm at the position 130 mm apart from the upper end of the support. Thus, an electrophotographic photosensitive member having a surface layer having depressed portions was produced. Upon observing the surface of the electrophotographic photosensitive member thus produced with a laser microscope ("VK-9500", manufactured by Keyence Corporation), it was found that a shape was formed in which a lot of pores were formed on the surface. The pore diameter was about 7 μm, and the depth was about 6 μm. These results are shown in Table 14.

Examples 27 to 30

Up to the formation of the charge generation layer were carried out in the same manner as in Example 26. Then, an electrophotographic photosensitive member was produced in the same manner as in Example 26, except that the types and amounts (added amounts) of the solvent A, solvent B, solvent C, and polymer compound in the coating solution for a surface layer were changed as shown in Table 12. Further, the surface of the electrophotographic photosensitive member was observed in the same manner as in Example 26. These results are shown in Table 14.

Comparative Examples 1 to 8

Resin films were produced in the same manner as in Example 1, except that the types and amounts (added amounts) of the solvent A, solvent B, solvent C, and polymer compound were changed as shown in Table 13. Further, the surfaces the resin films were observed in the same manner as in Example 1. These results are shown in Table 15.

Comparative Examples 9 and 10

Up to the step of forming the charge generation layers was carried out in the same manner as in Example 26. Then, electrophotographic photosensitive members were produced in the same manner as in Example 26, except that the types and amounts (added amounts) of the solvent A, solvent B, solvent C, and polymer compound in the coating solution for a surface layer were changed as shown in Table 13. Further, the surfaces of the electrophotographic photosensitive members were observed in the same manner as in Example 26. These results are shown in Table 15.

TABLE 9

| | | Compound Name | Added Amount | Solvent Ratio |
|---|---|---|---|---|
| Example 1 | Solvent A | Dimethyl sulfoxide | 3 Parts | 5% |
| | Solvent B | Monochlorobenzene | 27 Parts | 45% |
| | Solvent C | Dimethoxymethane | 30 Parts | 50% |
| | Polymer Compound | Polycarbonate resin (Compound 3-2) | 12 Parts | — |
| Example 2 | Solvent A | Dimethyl sulfoxide | 3 Parts | 5% |
| | Solvent B | Monochlorobenzene | 24 Parts | 40% |
| | Solvent C | Dimethoxymethane | 33 Parts | 55% |
| | Polymer Compound | Polycarbonate resin (Compound 3-2) | 12 Parts | — |
| Example 3 | Solvent A | Dimethyl sulfoxide | 3 Parts | 5% |
| | Solvent B | Monochlorobenzene | 18 Parts | 30% |
| | Solvent C | Dimethoxymethane | 39 Parts | 65% |
| | Polymer Compound | Polycarbonate resin (Compound 3-2) | 12 Parts | — |
| Example 4 | Solvent A | Dimethyl sulfoxide | 3 Parts | 5% |
| | Solvent B | Monochlorobenzene | 12 Parts | 20% |
| | Solvent C | Dimethoxymethane | 45 Parts | 75% |
| | Polymer Compound | Polycarbonate resin (Compound 3-2) | 12 Parts | — |
| Example 5 | Solvent A | Dimethyl sulfoxide | 3 Parts | 5% |
| | Solvent B | Monochlorobenzene | 6 Parts | 10% |
| | Solvent C | Dimethoxymethane | 51 Parts | 85% |
| | Polymer Compound | Polycarbonate resin (Compound 3-2) | 12 Parts | — |
| Example 6 | Solvent A | Dimethyl sulfoxide | 3 Parts | 5% |
| | Solvent B | Monochlorobenzene | 3.6 Parts | 6% |
| | Solvent C | Dimethoxymethane | 53.4 Parts | 89% |
| | Polymer Compound | Polycarbonate resin (Compound 3-2) | 12 Parts | — |

TABLE 9-continued

| | | Compound Name | Added Amount | Solvent Ratio |
|---|---|---|---|---|
| Example 7 | Solvent A | Triethylene glycol | 1.8 Parts | 3% |
| | Solvent B | Monochlorobenzene | 28.2 Parts | 47% |
| | Solvent C | Dimethoxymethane | 30 Parts | 50% |
| | Polymer Compound | Aromatic polyester resin (Compound 3-1) | 6 Parts | — |
| Example 8 | Solvent A | Triethylene glycol | 1.8 Parts | 3% |
| | Solvent B | Monochlorobenzene | 25.2 Parts | 42% |
| | Solvent C | Dimethoxymethane | 33 Parts | 55% |
| | Polymer Compound | Aromatic polyester resin (Compound 3-1) | 6 Parts | — |
| Example 9 | Solvent A | Triethylene glycol | 1.8 Parts | 3% |
| | Solvent B | Monochlorobenzene | 19.2 Parts | 32% |
| | Solvent C | Dimethoxymethane | 39 Parts | 65% |
| | Polymer Compound | Aromatic polyester resin (Compound 3-1) | 6 Parts | — |

TABLE 10

| | | Compound Name | Added Amount | Solvent Ratio |
|---|---|---|---|---|
| Example 10 | Solvent A | Triethylene glycol | 1.8 Parts | 3% |
| | Solvent B | Monochlorobenzene | 13.2 Parts | 22% |
| | Solvent C | Dimethoxymethane | 45 Parts | 75% |
| | Polymer Compound | Aromatic polyester resin (Compound 3-1) | 6 Parts | — |
| Example 11 | Solvent A | Triethylene glycol | 1.8 Parts | 3% |
| | Solvent B | Monochlorobenzene | 7.2 Parts | 12% |
| | Solvent C | Dimethoxymethane | 51 Parts | 85% |
| | Polymer Compound | Aromatic polyester resin (Compound 3-1) | 6 Parts | — |
| Example 12 | Solvent A | Triethylene glycol | 1.8 Parts | 3% |
| | Solvent B | Monochlorobenzene | 4.2 Parts | 7% |
| | Solvent C | Dimethoxymethane | 54 Parts | 90% |
| | Polymer Compound | Aromatic polyester resin (Compound 3-1) | 6 Parts | — |
| Example 13 | Solvent A | Triethylene glycol | 0.9 Parts | 1.5% |
| | Solvent A | Tetrahydrofurfuryl alcohol | 0.9 Parts | 1.5% |
| | Solvent B | Monochlorobenzene | 22.2 Parts | 37% |
| | Solvent C | Dimethoxymethane | 36 Parts | 60% |
| | Polymer Compound | Aromatic polyester resin (Compound 3-1) | 6 Parts | — |
| Example 14 | Solvent A | Triethylene glycol | 0.9 Parts | 1.5% |
| | Solvent A | Tetrahydrofurfuryl alcohol | 0.9 Parts | 1.5% |
| | Solvent B | Monochlorobenzene | 16.2 Parts | 27% |
| | Solvent C | Dimethoxymethane | 42 Parts | 70% |
| | Polymer Compound | Aromatic polyester resin (Compound 3-1) | 6 Parts | — |
| Example 15 | Solvent A | Triethylene glycol | 1.8 Parts | 3% |
| | Solvent B | Monochlorobenzene | 10.2 Parts | 17% |
| | Solvent C | Dimethoxymethane | 42 Parts | 70% |
| | Solvent C | Tetrahydrofuran | 6 Parts | 10% |
| | Polymer Compound | Aromatic polyester resin (Compound 3-3) | 6 Parts | — |
| Example 16 | Solvent A | Triethylene glycol | 0.6 Parts | 1% |
| | Solvent B | Monochlorobenzene | 11.4 Parts | 19% |
| | Solvent C | Dimethoxymethane | 42 Parts | 70% |
| | Solvent C | Tetrahydrofuran | 6 Parts | 10% |
| | Polymer Compound | Aromatic polyester resin (Compound 3-3) | 6 Parts | — |
| Example 17 | Solvent A | Triethylene glycol | 0.3 Parts | 0.5% |
| | Solvent B | Monochlorobenzene | 11.7 Parts | 19.5% |
| | Solvent C | Dimethoxymethane | 42 Parts | 70% |
| | Solvent C | Tetrahydrofuran | 6 Parts | 10% |
| | Polymer Compound | Aromatic polyester resin (Compound 3-3) | 6 Parts | — |

TABLE 11

| | | Compound Name | Added Amount | Solvent Ratio |
|---|---|---|---|---|
| Example 18 | Solvent A | Triethylene glycol | 0.06 Parts | 0.1% |
| | Solvent B | Monochlorobenzene | 11.94 Parts | 19.9% |
| | Solvent C | Dimethoxymethane | 42 Parts | 70% |
| | Solvent C | Tetrahydrofuran | 6 Parts | 10% |
| | Polymer Compound | Aromatic polyester resin (Compound 3-3) | 6 Parts | — |
| Example 19 | Solvent A | Polyethylene glycol | 6 Parts | 10% |
| | Solvent B | Toluene | 18 Parts | 30% |
| | Solvent C | Dimethoxymethane | 18 Parts | 30% |
| | Solvent C | Tetrahydrofuran | 18 Parts | 30% |
| | Polymer Compound | Polycarbonate resin (Compound 3-2) | 12 Parts | — |
| Example 20 | Solvent A | Polyethylene glycol | 6 Parts | 10% |
| | Solvent B | Xylene | 18 Parts | 30% |
| | Solvent C | Dimethoxymethane | 18 Parts | 30% |
| | Solvent C | Tetrahydrofuran | 18 Parts | 30% |
| | Polymer Compound | Aromatic polyester resin (Compound 3-1) | 6 Parts | — |
| Example 21 | Solvent A | Dipropylene glycol | 3 Parts | 5% |
| | Solvent B | Monochlorobenzene | 21 Parts | 35% |
| | Solvent C | Dimethoxymethane | 36 Parts | 60% |
| | Polymer Compound | Aromatic polyester resin (Compound 3-3) | 6 Parts | — |
| Example 22 | Solvent A | Triethylene glycol | 2.5 Parts | 5% |
| | Solvent B | Toluene | 5 Parts | 10% |
| | Solvent C | Ethyl acetate | 42.5 Parts | 85% |
| | Polymer Compound | Polyvinylbutyral resin (Compound 3-4) | 5 Parts | — |
| Example 23 | Solvent A | Polyethylene glycol | 3 Parts | 5% |
| | Solvent B | Toluene | 6 Parts | 10% |
| | Solvent C | Methanol | 51 Parts | 85% |
| | Polymer Compound | Copolymer nylon resin (Compound 3-6) | 3 Parts | — |
| Example 24 | Solvent A | Dipropylene glycol | 3 Parts | 5% |
| | Solvent B | Cyclohexane | 6 Parts | 10% |
| | Solvent C | Acetone | 51 Parts | 85% |
| | Polymer Compound | Polyvinylbutyral resin (Compound 3-4) | 6 Parts | — |
| Example 25 | Solvent A | Dimethyl sulfoxide | 3 Parts | 5% |
| | Solvent B | Monochlorobenzene | 6 Parts | 10% |
| | Solvent C | Methanol | 51 Parts | 85% |
| | Polymer Compound | N-Methoxymethylated nylon resin (Compound 3-5) | 3 Parts | — |

TABLE 12

| | | Compound Name | Added Amount | Solvent Ratio |
|---|---|---|---|---|
| Example 26 | Solvent A | Dimethyl sulfoxide | 2.94 Parts | 5% |
| | Solvent B | Monochlorobenzene | 14.7 Parts | 25% |
| | Solvent C | Dimethoxymethane | 41.16 Parts | 70% |
| | Polymer Compound | Polycarbonate resin (Compound 3-2) | 8.5 Parts | — |
| | Other Compound | Charge transport material (a) | 4.8 Parts | |
| | Other Compound | Charge transport material (b) | 0.5 Parts | |
| Example 27 | Solvent A | Triethylene glycol | 2.94 Parts | 5% |
| | Solvent B | Monochlorobenzene | 14.7 Parts | 25% |
| | Solvent C | Dimethoxymethane | 41.16 Parts | 70% |
| | Polymer Compound | Aromatic polyester resin (Compound 3-1) | 5.9 Parts | — |
| | Other Compound | Charge transport material (a) | 4.8 Parts | |
| | Other Compound | Charge transport material (b) | 0.5 Parts | |
| Example 28 | Solvent A | Triethylene glycol | 0.88 Parts | 1.5% |
| | Solvent A | Tetrahydrofurfuryl alcohol | 0.88 Parts | 1.5% |
| | Solvent B | Monochlorobenzene | 15.88 Parts | 27% |
| | Solvent C | Dimethoxymethane | 41.16 Parts | 70% |
| | Polymer Compound | Aromatic polyester resin (Compound 3-1) | 5.9 Parts | — |
| | Polymer Compound | Siloxane-modified resin (Compound 3-7) | 0.224 Parts | |
| | Other Compound | Charge transport material (a) | 4.8 Parts | |
| | Other Compound | Charge transport material (b) | 0.5 Parts | |

TABLE 12-continued

| | | Compound Name | Added Amount | Solvent Ratio |
|---|---|---|---|---|
| Example 29 | Solvent A | Dipropylene glycol | 1.76 Parts | 3% |
| | Solvent B | Monochlorobenzene | 15.88 Parts | 27% |
| | Solvent C | Dimethoxymethane | 41.16 Parts | 70% |
| | Polymer Compound | Aromatic polyester resin (Compound 3-3) | 5.9 Parts | — |
| | Polymer Compound | Siloxane-modified resin (Compound 3-7) | 0.224 Parts | |
| | Other Compound | Charge transport material (a) | 4.8 Parts | |
| | Other Compound | Charge transport material (b) | 0.5 Parts | |
| Example 30 | Solvent A | Polyethylene glycol | 1.76 Parts | 3% |
| | Solvent B | Monochlorobenzene | 15.88 Parts | 27% |
| | Solvent C | Dimethoxymethane | 41.16 Parts | 70% |
| | Polymer Compound | Aromatic polyester resin (Compound 3-3) | 5.9 Parts | — |
| | Other Compound | Charge transport material (a) | 4.8 Parts | |
| | Other Compound | Charge transport material (b) | 0.5 Parts | |

TABLE 13

| | | Compound Name | Added Amount | Solvent Ratio |
|---|---|---|---|---|
| Comparative Example 1 | Solvent A | Dimethyl sulfoxide | 3 Parts | 5% |
| | Solvent B | Monochlorobenzene | 57 Parts | 95% |
| | Polymer Compound | Polycarbonate resin (Compound 3-2) | 12 Parts | — |
| Comparative Example 2 | Solvent A | Dimethyl sulfoxide | 3 Parts | 5% |
| | Solvent B | Monochlorobenzene | 30 Parts | 50% |
| | Solvent C | Dimethoxymethane | 27 Parts | 45% |
| | Polymer Compound | Polycarbonate resin (Compound 3-2) | 12 Parts | — |
| Comparative Example 3 | Solvent A | Triethylene glycol | 1.8 Parts | 3% |
| | Solvent B | Monochlorobenzene | 58.2 Parts | 97% |
| | Polymer Compound | Aromatic polyester resin (Compound 3-1) | 6 Parts | — |
| Comparative Example 4 | Solvent A | Triethylene glycol | 1.8 Parts | 3% |
| | Solvent B | Monochlorobenzene | 31.2 Parts | 52% |
| | Solvent C | Dimethoxymethane | 27 Parts | 45% |
| | Polymer Compound | Aromatic polyester resin (Compound 3-1) | 6 Parts | — |
| Comparative Example 5 | Solvent A | Triethylene glycol | 2.5 Parts | 5% |
| | Solvent B | Toluene | 47.5 Parts | 95% |
| | Polymer Compound | Polyvinylbutyral resin (Compound 3-4) | 5 Parts | — |
| Comparative Example 6 | Solvent A | Polyethylene glycol | 3 Parts | 5% |
| | Solvent B | Toluene | 57 Parts | 95% |
| | Polymer Compound | Copolymer nylon resin (Compound 3-6) | 3 Parts | — |
| Comparative Example 7 | Solvent A | Dipropylene glycol | 3 Parts | 5% |
| | Solvent B | Cyclohexane | 57 Parts | 95% |
| | Polymer Compound | Polyvinylbutyral resin (Compound 3-4) | 6 Parts | — |
| Comparative Example 8 | Solvent A | Dimethyl sulfoxide | 3 Parts | 5% |
| | Solvent B | Monochlorobenzene | 57 Parts | 95% |
| | Polymer Compound | N-Methoxymethylated nylon resin (Compound 3-5) | 3 Parts | — |
| Comparative Example 9 | Solvent A | Dimethyl sulfoxide | 2.94 Parts | 5% |
| | Solvent B | Monochlorobenzene | 55.86 Parts | 95% |
| | Polymer Compound | Polycarbonate resin (Compound 3-2) | 8.5 Parts | — |
| | Other Compound | Charge transport material (a) | 4.8 Parts | |
| | Other Compound | Charge transport material (b) | 0.5 Parts | |
| Comparative Example 10 | Solvent A | Dimethyl sulfoxide | 2.94 Parts | 5% |
| | Solvent B | Monochlorobenzene | 44.1 Parts | 75% |
| | Solvent C | Dimethoxymethane | 11.76 Parts | 20% |
| | Polymer Compound | Polycarbonate resin (Compound 3-2) | 8.5 Parts | — |
| | Other Compound | Charge transport material (a) | 4.8 Parts | |
| | Other Compound | Charge transport material (b) | 0.5 Parts | |

TABLE 14

| | Pore Size [μm] | Depth [μm] |
|---|---|---|
| Example 1 | 10 | 8 |
| Example 2 | 9 | 8 |
| Example 3 | 8 | 7 |
| Example 4 | 6 | 5 |
| Example 5 | 4 | 3 |
| Example 6 | 3 | 2 |
| Example 7 | 5.5 | 5 |
| Example 8 | 5 | 4.5 |
| Example 9 | 4 | 3.5 |
| Example 10 | 3 | 2 |
| Example 11 | 2.5 | 1.5 |
| Example 12 | 2 | 1 |
| Example 13 | 4 | 2 |
| Example 14 | 3 | 1.5 |
| Example 15 | 3 | 2 |
| Example 16 | 2 | 1.5 |
| Example 17 | 1.5 | 1 |
| Example 18 | 1 | 0.8 |
| Example 19 | 8 | 5 |
| Example 20 | 8 | 5 |
| Example 21 | 5 | 4 |
| Example 22 | 7 | 6 |
| Example 23 | 2 | 1 |
| Example 24 | 4 | 3 |
| Example 25 | 2 | 1 |
| Example 26 | 7 | 6 |
| Example 27 | 5 | 4 |
| Example 28 | 3 | 1.5 |
| Example 29 | 2 | 1 |
| Example 30 | 4 | 3 |

TABLE 15

| | Pore Size [μm] | Depth [μm] | Note |
|---|---|---|---|
| Comparative Example 1 | — | — | No shape formed. Shape formed with extra rest time (5 minutes or more). |
| Comparative Example 2 | 12 | 10 | Pore size larger and deeper than in Examples 1 to 6. |
| Comparative Example 3 | — | — | Shape formation insufficient. Shape formed with extra rest time (5 minutes or more). |
| Comparative Example 4 | 8 | 7 | Pore size larger and deeper than in Examples 7 to 12. |
| Comparative Example 5 | — | — | Did not dissolve, coating impossible. |
| Comparative Example 6 | — | — | Did not dissolve, coating impossible. |
| Comparative Example 7 | — | — | Did not dissolve, coating impossible. |
| Comparative Example 8 | — | — | Did not dissolve, coating impossible. |
| Comparative Example 9 | — | — | No shape formed. Shape formed with extra rest time (5 minutes or more). |
| Comparative Example 10 | — | — | No shape formed. Shape formed with extra rest time (5 minutes or more). |

In all the Examples, after the solution of the present invention was applied, the rest time for forming depressed portions was uniformly set to be 3 minutes, and depressed portions were formed. However, in Comparative Examples 1, 3, 9, and 10, the shape of depressed portions was not formed even under the same conditions, or the formation of the shape was insufficient. That is, it is clear that the production method of the present invention is superior in production efficiency.

Further, from the comparison between Examples 1 to 6 and Comparative Example 2 and from the comparison between Examples 7 to 12 and Comparative Example 4, it is clear that the controllability of the pore size and depth of depressed portions is improved.

Furthermore, from Examples 22 to 25 and Comparative Examples 5 to 8, it is seen that the range in which the polymer compound can be selected is expanded.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-241017, filed Sep. 19, 2008, which is hereby incorporated by reference herein in its entirety.

What is claimed is:

1. A method for producing a solid body having depressed portions on its surface, comprising:

using a solution which comprises a solvent A, a solvent B, a solvent C, and a polymer compound, where the solvent B is a hydrophobic solvent, the solvent A is a hydrophilic solvent having a boiling point not lower than the boiling point of the solvent B, and the solvent C is a non-hydrophobic solvent having a boiling point lower than the boiling point of the solvent B, and the contents of the solvent A, solvent B, and solvent C satisfy the following conditions (1) to (5); and solidifying the solution while forming depressed portions on the surface of the solution by condensation during the process of evaporating the solvents included in the solution:

(1) the content of the solvent A is 0.1 mass % or more and less than 25.0 mass % based on the total mass of all the solvents included in the solution, (2) the content of the solvent B is larger than the content of the solvent A, (3) the content of the solvent B is 5.0 mass % or more and 49.9 mass % or less based on the total mass of all the solvents included in the solution, (4) the content of the solvent C is 50.0 mass % or more and 94.9 mass % or less based on the total mass of all the solvents included in the solution, and (5) the total content of the solvent A, solvent B, and solvent C is 90.0 mass % or more based on the total mass of all the solvents included in the solution.

2. The method for producing a solid body according to claim 1, wherein the boiling point of the solvent B is 100° C. or higher, and the boiling point of the solvent C is 70° C. or lower.

3. The method for producing a solid body according to claim 1, wherein the boiling point of the solvent C is 45° C. or lower.

4. The method for producing a solid body according to claim 1, wherein the solvent B is at least one solvent selected from the group consisting of toluene, o-xylene, m-xylene, p-xylene, 1,3,5-trimethylbenzene, and monochlorobenzene.

5. The method for producing a solid body according to claim 1, wherein the solvent A is at least one solvent selected from the group consisting of dimethylsulfoxide, polyethylene glycol, triethylene glycol, dipropylene glycol, and tetrahydrofurfuryl alcohol.

6. The method for producing a solid body according to claim 1, wherein the polymer compound is at least one of a polycarbonate resin and an aromatic polyester resin.

7. The method for producing a solid body according to claim 1, wherein the solvent C is dimethoxymethane.

8. A method for producing an electrophotographic photosensitive member, comprising forming a surface layer by a production method to claim 1.

* * * * *